United States Patent
Higuma

[11] 3,804,499
[45] Apr. 16, 1974

[54] MOTION PICTURE CAMERA CONTROLS
[75] Inventor: Toyonori Higuma, Tokyo, Japan
[73] Assignee: Kabushiki Kaisha Yashica, Tokyo-to, Japan
[22] Filed: Apr. 9, 1973
[21] Appl. No.: 349,278

[30] Foreign Application Priority Data
Apr. 18, 1972  Japan.............................. 47-45042

[52] U.S. Cl.................. 352/169, 318/467, 352/121, 352/137
[51] Int. Cl. .......................................... G03b 21/38
[58] Field of Search .......... 352/121, 137, 169, 174, 352/176, 177, 178, 179; 318/467

[56] References Cited
UNITED STATES PATENTS
2,679,186    5/1954    Schulte .............................. 352/179

Primary Examiner—Monroe H. Hayes
Attorney, Agent, or Firm—Steinberg & Blake

[57] ABSTRACT

A motion picture camera having an electromagnet which is energized only briefly in order to stop the operation of the camera. The camera is capable of being operated both continuously or in a single-frame mode. Also, the camera includes for starting and stopping purposes, a simple switch having only a pair of terminals bridged by a single switch blade. The circuitry which connects the above components is such that the electromagnet is briefly energized upon opening of a start-stop switch in order to terminate operation of the camera motor as well as to automatically bring about deenergizing of the electromagnet with the camera motor being capable of resuming its operation only upon closing of the start-stop switch.

10 Claims, 8 Drawing Figures

MOTION PICTURE CAMERA CONTROLS

BACKGROUND OF THE INVENTION

The present invention relates to motion picture cameras.

More particularly, the present invention relates to controls for motion picture cameras and especially to controls to be utilized in connection with starting and stopping such a camera.

One of the important requirements of a motion picture camera is that the rotary shutter thereof be stopped at a given angular position. It is already known to produce this latter result by electromagnetically actuating a stop member which engages a rotary member to assure termination of rotary movement of the shutter when the latter has reached a given angular position. However, devices of this latter type have a considerable disadvantage in that energizing of the electromagnetic structure consumes an undesirably large amount of energy. The reason for this large use of energy is that the electromagnetic mechanism must be energized over a long period of time, and as a result of this large amount of power required for the electromagnetic mechanism economic use thereof cannot be practically effected.

In addition, in order to release conventional motion picture cameras for operation it is essential to use complex release switches having three terminals and two circuits. This latter construction requires the use of a suitable relay switch for remote operation of the camera as well as for controlling the camera automatically to make exposures at predetermined intervals.

SUMMARY OF THE INVENTION

It is accordingly a primary object of the present invention to provide a motion picture camera which will avoid the above drawbacks.

In particular, it is an object of the present invention to provide a motion picture camera of the above type which has an electromagnetic mechanism which will consume only a small amount of power, far less than is required at the present time by conventional structures of this type.

It is also an object of the present invention to provide a camera of the above type which has an exceedingly simple start-stop switch requiring only a pair of terminals and a single switch blade for bridging across these terminals when the switch is closed.

Furthermore, it is an object of the present invention to provide for a camera of the above type circuitry which will enable this single release or start-stop switch to be utilized both in connection with continuous operation of the camera as well as in connection with single-frame operation of the camera.

Thus, it is an object of the present invention to provide a camera of the above general type which requires for remote operation only a pair of conductors without requiring the use of any relay components.

According to the invention the camera includes an electric driving motor and a normally closed control switch means electrically connected with the driving motor to permit the latter to operate only when this control switch means is in a closed position, so that operation of the motor is necessarily terminated when the control switch means is in an open position thereof. An electromagnetic means is positioned with respect to the control switch means for urging the latter to its open position when the electromagnetic means is energized. However, the control switch means is also electrically connected to the electromagnetic means to deenergize the latter when the control switch means is in its open position. A start-stop switch means is also electrically connected to the motor for starting the operation thereof when the start-stop switch means is closed and for at least initiating conditions for terminating the operation of the driving motor when the start-stop switch means is opened. A circuit means is electrically connected between the start-stop switch means and the electromagnetic means and driving motor for energizing the electromagnetic means when the start-stop switch means is opened, so that in this way the electromagnetic means will open the normally closed control switch means to terminate the operation of the motor as well as to deenergize the electromagnetic means, with the circuit means preventing the electric motor from resuming its operation until the start-stop switch means is closed. This circuit means includes a capacitor means for retaining a charge sufficient to energize the electromagnetic means upon opening of the start-stop switch means, the latter being connected across the capacitor means to prevent the latter from energizing the electromagnetic means while the start-stop switch means is closed.

BRIEF DESCRIPTION OF DRAWINGS

The invention is illustrated by way of example in the accompanying drawings which form part of this application and in which:

FIG. 3 is a wiring diagram of an embodiment similar to that of FIG. 1 except that the embodiment of FIG. 3 includes an additional delay circuit.

DESCRIPTION OF PREFERRED EMBODIMENTS

Figure 1:
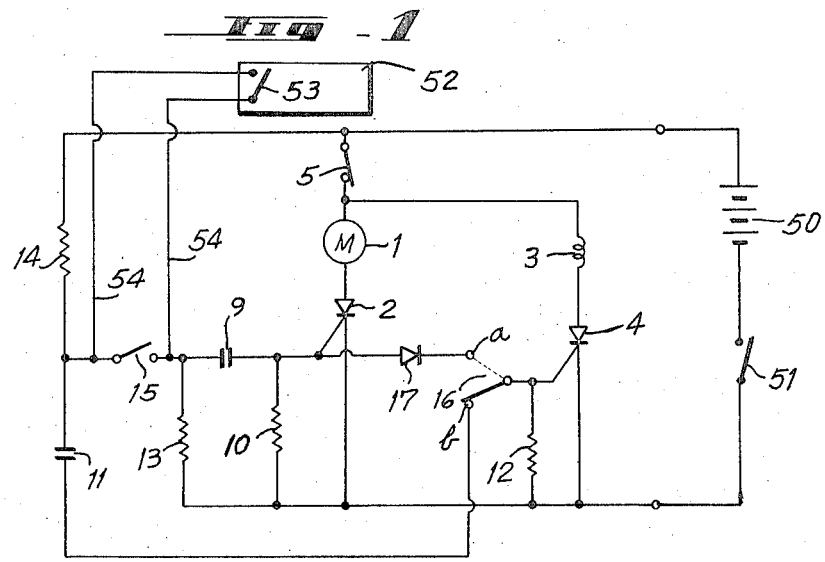
FIG. 1 is a partly schematic wiring diagram of one embodiment of circuitry capable of achieving the desired results.
Figure 2:
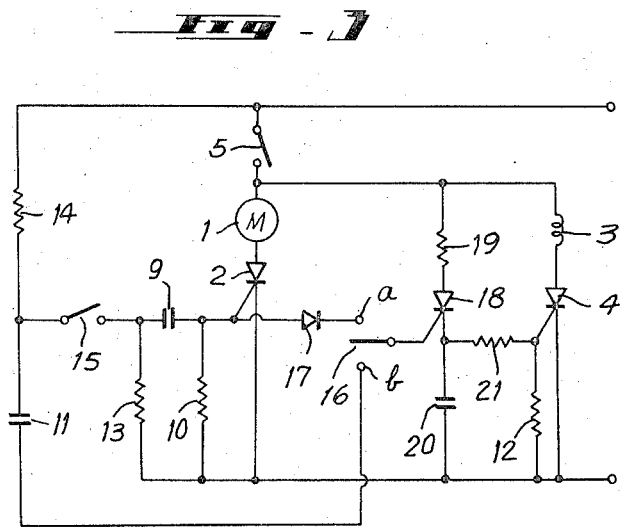
FIGS. 2A–2C schematically and fragmentarily illustrate a normally closed control switch means as well as an electromagnetic means which cooperates therewith and a blocking means which prevents opening of the control switch means until a shutter has reached a given angular position.
Figure 2A:
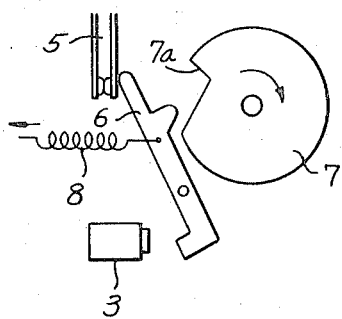
Figure 2B:
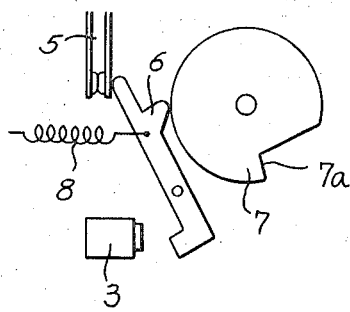
Figure 2C:
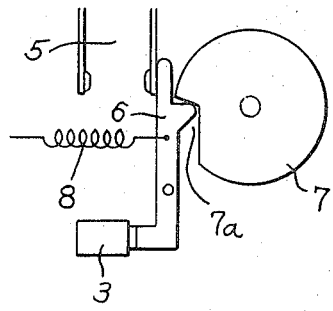

Referring first to FIG. 1 which illustrates a typical embodiment of the present invention as well as to FIGS. 2A–2C which schematically illustrate components of the structure of the invention in different positions, there is schematically represented in FIG. 1 a driving motor 1, which is an electrical motor for operating the camera when the motor is energized. In a manner which is well known and thus forms no part of the present invention the driving motor 1 will drive components such as the rotary camera shutter and a take-up spool onto which exposed film is wound. FIG. 1 further illustrates a circuit means which includes a silicon control rectifier element or SCR 2 which is connected in series with the motor 1.

An electromagnetic means 3 is connected in parallel with the motor 1 and in series with a second SCR 4 of the circuit means illustrated in FIG. 1. The electromagnetic means 3 controls stopping of the operation of the motor 1 in a manner described in greater detail below.

Both the motor 1 and the electromagnetic means 3 are connected in series with a normally closed control switch means 5 so that when the latter is in its open position both the electric motor 1 and the electromagnetic means 3 are necessarily deenergized.

Referring to FIGS. 2A-2C it will be seen that the normally closed control switch means 5 includes a pair of switch blades which due to their springy characteristics tend to assume the open position shown at the upper part of FIG. 2C. However, the control switch means also includes a single lever 6 and a spring 8 operatively connected thereto for urging the lever 6 to turn in a counterclockwise direction, as viewed in FIGS. 2A-2C. Therefore, the control switch means normally has the closed position illustrated in FIGS. 2A and 2B, since the force of the spring 8 is sufficiently great to enable the lever 6 to maintain the switch elements of the control switch means 5 in the closed position of FIGS. 2A and 2B. The lower end of the lever 6, as viewed in FIGS. 2A-2C forms an armature to be attracted by the electromagnetic means 3 when the latter is energized, so that in this way the lever 6 is displaced in opposition to the difference between the force of the spring 8 and the force inherent in the springy switch elements to the position shown in FIG. 2C, thus placing the switch means 5 in its open position upon energizing of the electromagnetic means 3.

However, this structure also includes a blocking means 7 in the form of a rotary cam which is connected with the shutter so as to rotate therewith when the motor 1 is operating. This cam 7 has a periphery engaging a projection of the lever 6 for maintaining the lever 6 in the position shown in FIG. 2B even if the electromagnetic means 3 is energized. It is only when the notch 7a, which is formed in the periphery of the rotary cam 7, reaches the projection of the lever 6 that this projection can move into the notch, as shown in FIG. 2C, in order to free the lever 6 to be turned to the position of FIG. 2C by the energized electromagnetic means 3, and in this way the angular position of the cam 7 is predetermined when the control switch means 5 is opened as illustrated in FIG. 2C. Since the shutter is compelled to have an angular position corresponding to that of the cam 7, this construction will assure that the shutter stops at a given angular position when the control switch means 5 is in its open position as shown in FIG. 2C.

It is to be noted, however, as is apparent from the above description and the circuitry shown in FIG. 1, that the opening of the switch means 5 provides deenergizing of the electromagnetic means 3, so that immediately after the control switch means has been opened to assume the position shown in FIG. 2C, the electromagnetic means 3 becomes deenergized and the spring 8 acts on the lever 6 to return the control switch means 5 to the normally closed position thereof shown in FIG. 2A. As is apparent from the arrow in FIG. 2A, the motor 1 operates to rotate the cam 7 in a direction which is clockwise, as viewed in FIGS. 2A-2C.

The circuit means of FIG. 1 includes a differentiation circuit made up of a capacitor 9 and a resistance 10, this latter differentation circuit being capable of rendering SCR 2 conductive when an output is applied to the SCR 2 from the differentiation circuit 9, 10. The circuit means includes a second differentiation circuit composed of capacitor 11 and resistance 12, and the output of this latter differentiation circuit will render SCR 4 conductive. The circuit means further includes a discharge resistance 13 of a relatively high resistance value connected in a closed loop with the capacitor 9 and the resistance 10, as shown in FIG. 1. Also, the circuitry includes a protective resistance 14 connected in series with the capacitor 11.

A start-stop switch means 15 is connected on the one hand to a junction between capacitor 11 and resistance 14 and on the other hand to a junction between capacitor 9 and resistance 13. It will be noted that this start-stop switch means 15 is in the form of a simple switch having only a pair of terminals and a single switch blade for bridging across these terminals in order to close the switch means 15. As is shown in FIG. 1, the switch means 15 is also connected between a pair of conductors 54 capable of being connected to each other by a remote switch 53 of a control 52 available for remote operation of camera, so that through the unit 52 it is possible to operate the switch 53 so that the latter can be substituted for the switch 15 at the camera itself. Because of the simplicity of the switch 15, this remote control is exceedingly simple requiring only the pair of conductors 54 and the single switch 53, without requiring the use of any relays or the like. The unit 52, instead of being used for simple remote operation, can also include components for regularly closing and opening the switch 53 at predetermined intervals to provide for automatic exposures at given intervals, such as are desirable for time lapse photography.

The circuit means of FIG. 1 also includes a selecting switch means 16 having a pair of terminals a and b. When the selecting switch means 16 is connected into the circuit at its terminal b, the operator has the selected continuous camera operation while when the switch means 16 is connected into the circuit at the terminal a, the operator has selected single-frame operation. The circuitry of FIG. 1 is completed by diode 17 connected to the terminal a in the manner illustrated in FIG. 1.

FIG. 1 also shows schematically a power source 50 in the form of one or more batteries, as well as a power source switch 51 which the operator closes prior to further operation of the camera in a manner described below.

Assuming that it is desired to provide for continuous operation of the camera, then the selecting switch means 16 is placed in engagement with the terminal b after the switch 51 has been closed. It is to be noted that the initial closing of the switch 51 will provide from the differentiating circuit 11, 12 an output which transfers SCR 4 to its conductive state so that electromagnetic means 3 is energized, and, as is apparent from FIG. 2C, the electromagnetic means will operate to turn the lever 6 to the position of FIG. 2C, but the opening of the control switch means 5 will immediately deenergize the electromagnetic means 3 so that the control switch means returns to the position of FIG. 2A before the operator has an opportunity to close the switch 15. Thus, the lever 6 returns to the position of FIG. 2A immediately after the brief and temporary transfer of the SCR 4 to its conductive state.

Therefore, when the operator closes the start-stop switch means 15 in order to start the operation of the camera the control switch means 5 is in the position of FIG. 2A. The output from the differentiating circuit 9, 10, upon closing of the switch 15, renders SCR 2 conductive so that the motor 1 is now energized and the camera operates. At this time because the start-stop switch means 15 is closed, the capacitor 11 discharges through the resistance 13, as well as the resistance 12 and the switch 16, which is in the solid line position of FIG. 1, so that the gate voltage of SCR 4 drops, and SCR 4 remains in its non-conductive state preventing energizing of electromagnetic means 3. Thus, the control switch means 5 will remain in the normally closed position of FIG. 2A and the cam 7 together with the shutter which is not illustrated are free to rotate so that the camera may be operated at this time in a continuous mode.

When it is desired to terminate the continuous operation of the camera, the operator will displace the start-stop switch means 15 to its open position, with the result that the output from differentiation circuit 11, 12 will now be applied to the gate of SCR 4 to render the latter conductive, and thus the electromagnetic means 3 will be energized. Therefore, the electromagnetic means 3 seeks to turn the lever 6 in a clockwise direction, as viewed in FIGS. 2A–2C. However, if the shutter is in any angular position except that corresponding to the angular position of cam 7 which is shown in FIG. 2C, the blocking means formed by the cam 7 will prevent opening of the control switch means 5 by engagement of the periphery of the cam 7 with the projection of the lever 6, as shown in FIG. 2B. Thus, the motor 1 will continue to operate and the electromagnetic means 3 will remain energized until the cam 7 reaches the position shown in FIG. 2C, and at this time when the shutter is in a predetermined angular position, the energized electromagnetic means 3 will bring about opening of the control switch means 5 to terminate the operation of the motor 1 and also deenergize the electromagnetic means 3 so that the switch means will resume its normal closed position as described above. At this time the charge of the capacitor 9 has been dissipated through the discharge resistance 13 and the resistance 12 so that there is no output from the differentiating circuit 9, 10 which is capable of rendering SCR 2 conductive, with the result that SCR 2 remains in its non-conductive state and the motor 1 does not resume its operation when the control switch means 5 returns to its normally closed position. Thus, the circuit means of the invention assures that the motor 1 will not start operating again until the start-stop switch means 15 is again closed.

If the operator selects single-frame photography, the selecting switch means 16 is displaced to the dotted line position of FIG. 1 where the terminal $a$ is connected into the circuit. Now when the start-stop switch means 15 is closed, subsequent to closing of the switch 51 as described above, the output of differentiating circuit 9, 10 will be applied to SCR 2 in order to render the latter conductive and the motor 1 will start to operate. At the same time, a differentiation circuit made up at this time of the capacitor 9 and the resistance 12 provides an output to the SCR 4 in order to render the latter conductive, and thus the electromagnetic means 3 is also energized. However, since the motor 1 has started to operate, the cam 7 has already been displaced sufficiently beyond the position shown in FIG. 2A to provide the blocking action as shown in FIG. 2B, and thus the control switch means 5 remains closed. It is only after the cam 7 has turned through a single revolution that the notch 7a will reach the position of FIG. 2C, releasing the control switch means 5 for movement by the energized electromagnetic means 3 to the open position of FIG. 2C, and thus the camera has operated to expose only a single frame, the opening of the switch means 5 terminating the operation of the motor 1 as described above. Also, the opening of the switch means 5 deenergizes the electromagnetic means 3 so that the switch means 5 now resumes its normally closed position, as described above.

In this way it is possible for the circuitry to bring about single-frame operation of the camera. However, there is a certain disadvantage in the simultaneous energizing of the motor 1 and the electromagnetic means 3 since the motor 1 is compelled to turn the cam 7 against the force of friction and the periphery of the cam 7 resulting from the attraction of the electromagnetic means 3. In order to avoid this latter disadvantage the energizing of the electromagnetic means 3 is preferably delayed with respect to the energizing of the motor 1.

Thus, referring to FIG. 3, it will be seen that the embodiment of FIG. 3 is identical with that of FIG. 1 except that FIG. 3 includes a delay circuit for bringing about energizing of electromagnetic means 3 only after a given interval has elapsed subsequent to energizing of the motor 1. The delay means of FIG. 3 includes an SCR 18, a timing resistance 19 and a capacitor 20 connected to each other in the manner shown in FIG. 3 in advance of the electromagnetic means 3. The switch blade of the selecting switch means 16 is connected directly to the gate of SCR 18 and capacitor 20 is connected at one terminal or electrode thereof through a resistor 21 to the gate of SCR 4. With this circuit the operation or energizing of electromagnetic means 3 is delayed according to a time constant which is determined by the characteristics of resistance 19 and capacitor 20.

Figure 4:
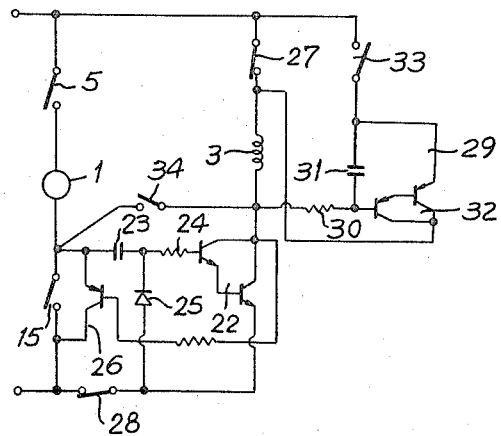
FIGS. 4–6 respectively illustrate further possible embodiments of circuitry in accordance with the present invention.
Figure 5:
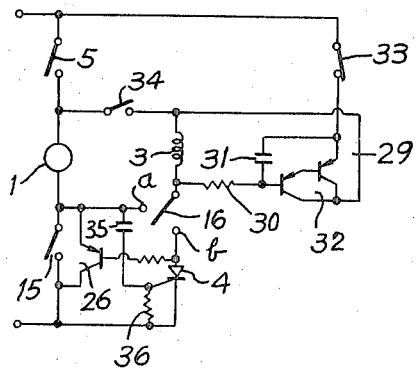
Figure 6:
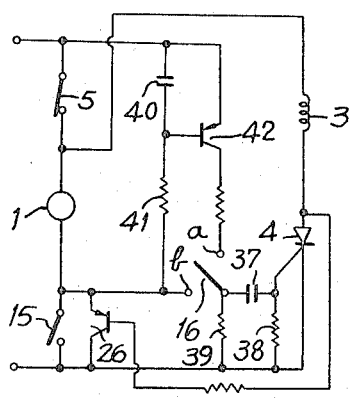

FIGS. 4–6 respectively illustrate further possible embodiments of the invention, with the components of FIGS. 4–6 which correspond to and operate in the same way as those described above being designated by the same reference characters.

According to the embodiment of the invention which is illustrated in FIG. 4, the start-stop switch means 15 is connected in series with the motor 1 with the latter connected in series with the control switch means 5. A second series circuit includes the electromagnetic means 3 and a Darlington circuit 22, this second series circuit being connected in parallel with the first series circuit composed of components 5, 1, and 15.

Instead of the capacitor means 11 of FIGS. 1 and 3 for retaining a charge sufficient to energize the electromagnetic means upon opening of the start-stop switch means, the embodiment of FIG. 4 includes a capacitor means 23 and a resistance 24 which together form an input circuit for the Darlington circuit 22, this input circuit being connected in parallel with the start-stop switch means 15 at a junction between the latter and the motor 1. The circuit means of FIG. 4 further includes a discharge diode 25 and a transistor 26 to compensate for energizing the motor 1 after the start-stop switch means 15 has been opened. The transistor 26 transfers to its conductive state when the Darlington circuit 22 transfers to its conductive state, and the transistor 26 maintains a predetermined internal resistance so that the charge of capacitor means 23 is prevented from becoming completely discharged. Therefore with transistor 26 turned ON, Darlington circuit 22 is maintained conductive. The circuit means of FIG. 4 includes a pair of switches 27 and 28 which are simultaneously closed when operating in a continuous mode. A circuit 29 is provided for controlling electromagnetic means 3 during operation in a single-frame mode, and this circuit 29 includes the capacitor 31 and resistor 30 which form a timing resistance and capacitor to delay the instant when Darlington circuit 32 operates, so that in this way the embodiment of FIG. 4 includes a delay circuit, as was the case with the embodiment of FIG. 3, in order to energize electromagnetic means 3 after elapse of a given interval subsequent to starting of the motor 1, during single-frame photography. The circuit of FIG. 4 includes a pair of switches 33 and 34 which are simultaneously closed when it is desired to operate in a single-frame mode. Thus, in the embodiment of FIG. 4 the switches 27, 28 and 33, 34 form the selecting switch means for selecting between continuous and single-frame operation.

Assuming that switches 27 and 28 are closed while switches 33 and 34 are open as shown in FIG. 4, so that the operator has selected continuous operation of the camera, then when the operator closes the start-stop switch 15 the motor 1 will start to operate. This closing of the switch 15 permits a transient current to flow through the capacitor 23, thus rendering Darlington circuit 22 conductive. As was pointed out above, the transistor 26 prevents the capacitor 23 from becoming completely discharged. Therefore, when the operator opens switch 15 in order to terminate the operation of the camera, electromagnetic means 3 will become energized to terminate the operation of the motor 1 by opening the switch 5 when the shutter has reached a given angular position, as pointed out above, and of course the switch 5 immediately resumes its closed position. At the same time the camera will not start again because the charge retained by capacitor 23 has been dissipated, and thus the electromagnetic means 3 remains unenergized, and the only way to resume camera operation is to close switch 15 again.

On the other hand, if the operator selects single-frame photography, the switches 27 and 28 will be opened while the switches 33 and 34 will be closed, so that in this way the Darlington circuit 32 will be rendered conductive after the brief interval subsequent to energizing of the motor 1, thus energizing the electromagnetic means 3 to bring about opening of the switch 5 after the cam 7 has turned through a single revolution as described above.

FIG. 5 shows an embodiment of the invention which is identical with that of FIG. 4 with respect to the single-frame operation. However, with FIG. 5 there is also a selecting switch means 16 as described above in connection with FIGS. 1 and 3. Also, the embodiment of FIG. 5 includes an SCR 4 connected into the circuit when selecting switch means 16 engages terminal b for continuous operation. The circuitry of FIG. 5 also includes a differentiation circuit composed of capacitor 35 and resistance 36 providing an output which is applied to the gate of SCR 4. This differentiation circuit 35, 36 is connected in parallel with start-stop switch means 15 and includes the terminal a of selecting switch means 16 for single-frame photography. In other words, terminal a is connected to one of the terminals or electrodes of capacitor 35 as shown. The circuit means of FIG. 5 further includes a transistor 26 which corresponds to the transistor 26 of FIG. 4 and which has its base connected through a suitable resistor to a junction between terminal b and SCR 4, while the switch 15 is connected between the emitter and collector of transistor 26 in the same way as with the embodiment of FIG. 4. Thus, with the embodiment of FIG. 5 during continuous photography closing of the switch 15 will bring about operation of the motor 1 while capacitor 35 in cooperation with resistance 36 will retain a charge sufficient to render SCR 4 conductive upon opening of the switch 15 so as to stop the shutter in the manner described above. It is to be noted that it is also possible to achieve a similar result simply by transferring the selecting switch means 16 from engagement with the terminal b into engagement with the single-frame terminal a.

FIG. 6 illustrates an embodiment of the invention which also corresponds to the embodiment of FIG. 4, with the embodiment of FIG. 6 having a differentiation circuit made up of capacitor 37 and resistance 38 in order to render SCR 4 conductive with the output of the differentiation circuit 37, 38. The circuit means of FIG. 6 includes a discharge resistance 39. Also, the circuit means of FIG. 6 includes, for single-frame photography, a delay or timing circuit composed of capacitor 40 and resistance 41 which during single-frame photography when the selecting switch means 16 engages the terminal a renders transistor 42 conductive after a predetermined interval, so that in this way during single frame photography electromagnetic means 3 will be energized only after elapse of a given interval subsequent to energizing of the motor 1. Thus, the embodiment of FIG. 6 will produce also the results described above both during continuous and single-frame operation.

Thus, as is apparent from the above description and the drawings, the time required for energizing electromagnetic means 3 upon termination of continuous photography corresponds to the extremely short interval required to open the start-stop switch means, so that the duration of operation of the electromagnetic means which otherwise would require a source of relatively high power may be effectively shortened with a resulting substantial reduction in power consumption. Furthermore, with the present invention the motor will always stop when the shutter has reached a predetermined angular position, so that an extremely precise positioning of the shutter is assured when the operation of the camera is terminated.

Of course, the construction shown in FIG. 1 and described above in connection with remote control or automatic operation at given intervals requires only the pair of conductors and a simple switch having only two terminals. Furthermore, the selecting switch means 16 for selecting between continuous and single-frame photography is exceedingly simple requiring only three terminals two circuits. Moreover, the capacitors of the invention are used primarily for interruption of current flow so that these capacitors require only a small capacity and thus are inexpensive.

What is claimed is:

1. In a motion picture camera, an electrical driving motor, normally closed control switch means having open and closed positions and being electrically connected with said motor for permitting the latter to operate only when said control switch means is in said closed position, electromagnetic means positioned with respect to said control switch means for urging the latter to its open position when said electromagnetic means is energized, said control switch means being electrically connected with said electromagnetic means for permitting energizing thereof only when said control switch means is in its closed position so that said control switch means returns to its closed position immediately after being in its open position, start-stop switch means electrically connected with said motor for starting the latter upon closing of said start-stop switch means and for at least initiating conditions for terminating operation of said motor upon opening of said start-stop switch means, and circuit means electrically connected between said start-stop switch means and said electromagnetic means for energizing the latter upon opening of said start-stop switch means and for preventing starting of said motor until said start-stop switch means is closed, whereby upon opening of said start-stop switch means said electromagnetic means will become energized to bring about opening of said control switch means to terminate the operation of the motor and to deenergize said electromagnetic means, so that said control switch means immediately resumes its closed position while said motor cannot resume its operation until said start-stop switch means is closed.

2. The combination of claim 1 and wherein a blocking means coacts with said normally closed control switch means for blocking the same against movement to said open position thereof until a shutter of the camera is in a predetermined angular position, so that deenergizing of said electromagnetic means and stopping of said motor occur only when the camera shutter reaches said angular position thereof.

3. The combination of claim 2 and wherein said blocking means is mechanical and includes a rotary cam having a periphery engaging said normally closed control switch means to maintain the latter closed, said cam being formed at its periphery with a notch for receiving part of said normally closed control switch means to release the latter to be opened by said electromagnetic means when the latter is energized.

4. The combination of claim 1 and wherein said start-stop switch means includes only a pair of terminals bridged by a single switch blade when said start-stop switch means is closed.

5. The combination of claim 1 and wherein said circuit means includes a capacitor means electrically connected between said start-stop switch means and said electromagnetic means for retaining upon opening of said start-stop switch means a charge sufficient to energize said electromagnetic means and said start-stop switch means being connected across said capacitor means to prevent the latter from energizing said electromagnetic means when said start-stop switch means is closed.

6. The combination of claim 1 and wherein said circuit means includes a selecting switch means for selecting continuous or single-frame operation.

7. The combination of claim 6 and wherein said circuit means energizes both said motor and said electromagnetic means when said selecting switch means is positioned for selecting single-frame operation, upon closing of said start-stop switch means.

8. The combination of claim 7 and wherein a delay means is electrically connected with said electromagnetic means for delaying energizing of the latter until a given interval has elapsed after the motor has started to operate.

9. The combination of claim 1 and wherein an SCR is electrically connected with said electromagnetic means and forms part of said circuit means for controlling energizing of said electromagnetic means.

10. The combination of claim 1 and wherein said circuit means includes a capacitor means for retaining a charge sufficient to energize said electromagnetic means upon opening of said start-stop switch means, and a transistor connected across said start-stop switch means between the latter and said capacitor means for controlling the operation of the latter.

* * * * *